(12) United States Patent
Hall et al.

(10) Patent No.: US 12,548,596 B2
(45) Date of Patent: Feb. 10, 2026

(54) SECTOR SLIDING IN SHINGLED MAGNETIC RECORDING HARD DISK DRIVE

(71) Applicant: Western Digital Technologies, Inc., San Jose, CA (US)

(72) Inventors: David R. Hall, Rochester, MN (US); Andrew Larson, Rochester, MN (US); Zarko Popov, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/528,718

(22) Filed: Dec. 4, 2023

(65) Prior Publication Data

US 2025/0182792 A1   Jun. 5, 2025

(51) Int. Cl.
*G11B 20/12* (2006.01)
*G11B 5/596* (2006.01)

(52) U.S. Cl.
CPC ...... *G11B 20/1217* (2013.01); *G11B 5/59627* (2013.01); *G11B 2020/1238* (2013.01)

(58) Field of Classification Search
None
See application file for complete search history.

(56) References Cited

U.S. PATENT DOCUMENTS

| | | | |
|---|---|---|---|
| 8,699,162 B1 * | 4/2014 | Grobis | G11B 20/18 360/75 |
| 8,867,153 B1 | 10/2014 | Coker et al. | |
| 8,988,800 B1 * | 3/2015 | Varnica | G06F 11/1076 360/78.04 |
| 8,988,810 B1 | 3/2015 | Liew et al. | |
| 9,281,008 B1 | 3/2016 | Harlee et al. | |
| 9,304,930 B2 | 4/2016 | Shu et al. | |
| 9,536,563 B1 * | 1/2017 | Liu | G06F 11/1469 |
| 9,632,863 B2 | 4/2017 | Galbraith et al. | |
| 9,711,177 B1 * | 7/2017 | Shin | G11B 20/1816 |
| 10,249,338 B2 | 4/2019 | Qiang et al. | |

(Continued)

OTHER PUBLICATIONS

Aruga, Keiji, Off-Track Capability Simulation of Shingled Magnetic Recording Under Mechanical Track Misregistration, IEEE Transactions on Magnetics, Jun. 2013, Manuscript received Nov. 29, 2012; revised Mar. 15, 2013; accepted Mar. 22, 2013, pp. 2495-2499, vol. 49, No. 6, IEEE.

(Continued)

*Primary Examiner* — Fred Tzeng
(74) *Attorney, Agent, or Firm* — John D. Henkhaus

(57) ABSTRACT

Controlling a shingled magnetic recording (SMR) hard drive involves attempting a sequential write to a first sector of a sequence of sectors and, responsive to encountering a write inhibit boundary corresponding to the first sector, continuing the write to the next available sector in the sequence of sectors for the write. Thus, instead of that write inhibit triggering a hard error, the data is adaptively written to the next down-track physical sector possible, i.e., "sliding" to the next sector. This does not require an additional disk revolution thus there is negligible performance penalty. The write may be continued to the next track if necessary, and may continue through the entire zone, to maintain all the data in sequential form for performance and large block protection purposes.

19 Claims, 5 Drawing Sheets

ATTEMPT A SEQUENTIAL WRITE TO A FIRST SECTOR OF A SEQUENCE OF SECTORS OF A RECORDING DISK
402

RESPONSIVE TO ENCOUNTERING A WRITE INHIBIT BOUNDARY CORRESPONDING TO THE FIRST SECTOR, CONTINUE THE SEQUENTIAL WRITE TO THE NEXT AVAILABLE SECTOR IN THE SEQUENCE OF SECTORS FOR THE SEQUENTIAL WRITE
404

(56) References Cited

U.S. PATENT DOCUMENTS

| | | | |
|---|---|---|---|
| 10,748,568 B1 | 8/2020 | Chahwan et al. | |
| 10,770,110 B1* | 9/2020 | Ehrlich | G11B 20/1217 |
| 10,770,111 B1* | 9/2020 | Zayas | G11B 20/1889 |
| 10,867,633 B1* | 12/2020 | Liu | G11B 5/012 |
| 10,930,315 B2* | 2/2021 | Burd | G06F 11/1076 |
| 11,656,797 B2 | 5/2023 | Hall | |
| 2003/0112544 A1* | 6/2003 | Harmer | G11B 5/59627 |
| | | | 360/77.02 |
| 2013/0335856 A1 | 12/2013 | Tanabe et al. | |
| 2015/0179214 A1 | 6/2015 | Pantel | |
| 2015/0185319 A1 | 7/2015 | Matsuura et al. | |
| 2016/0012850 A1* | 1/2016 | Feldman | G11B 20/1889 |
| | | | 360/48 |
| 2017/0229141 A1 | 8/2017 | Ide et al. | |
| 2018/0074728 A1 | 3/2018 | Chahwan et al. | |
| 2018/0182432 A1* | 6/2018 | Liu | G11B 5/59633 |
| 2018/0182433 A1* | 6/2018 | Shin | G11B 20/1816 |
| 2019/0391748 A1* | 12/2019 | Li | G06F 3/0649 |
| 2021/0098019 A1* | 4/2021 | Ehrlich | G11B 5/59688 |
| 2022/0113885 A1* | 4/2022 | Jeon | G06F 12/0246 |
| 2023/0306994 A1* | 9/2023 | Hanson | G11B 5/012 |

OTHER PUBLICATIONS

Toshiba, Large-Capacity HDDs Applying SMR Technology for Data Centers, 6 pages, 2020, Toshiba Electronic.Devices & Storage Corporation, downloaded at https://toshiba.semicon-storage.com/content/dam/toshiba-ss-v3/master/en/company/technical-review/pdf/technical-review-large-capacity-hdds_e.pdf as early as Aug. 29, 2023.

* cited by examiner

SECTOR SLIDING IN SHINGLED MAGNETIC RECORDING HARD DISK DRIVE

FIELD OF EMBODIMENTS

Embodiments of the invention may relate generally to data storage devices such as hard disk drives and particularly to approaches to adaptively sliding sectors to a next available sector in a shingled magnetic recording (SMR) hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Conventional magnetic recording (CMR) places gaps between recording tracks on HDDs to account for track misregistration (TMR) budget, where TMR generally refers to where a track-following/servoing head is relative to where it is supposed to be, i.e., the variance of the deviation of the read/write head from the center of a data track. These separators impact areal density (a measure of the quantity of information bits that can be stored on a given area of disk surface), as portions of the disk surface are not fully utilized for data storage. Increasing areal density is one of the ongoing goals of HDD technology evolution, and has led to the necessary development and implementation of various means for reducing the disk area needed to record a bit of information. In one form, this goal manifests in the use of a recording paradigm referred to as shingled magnetic recording (SMR). Shingled magnetic recording removes the gaps between tracks by sequentially writing tracks in an overlapping manner, forming a pattern similar to shingles on a roof. By repeating this process, more data tracks can be placed on each magnetic surface.

The write head designed for SMR drives is wider than required to read a single track of data. Once one track has been written, the recording head is advanced by only part of its width, so the next track will partially overwrite the previous one, leaving only a narrow band for reading. This remaining band is the track width of the written track. Overlapping tracks are typically grouped into bands (called zones) of fixed capacity for more effective data organization and partial update capability. Recording gaps between bands (often referred to as "guard bands") are laid to prevent data overwrite by the wide write head from one band to another.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
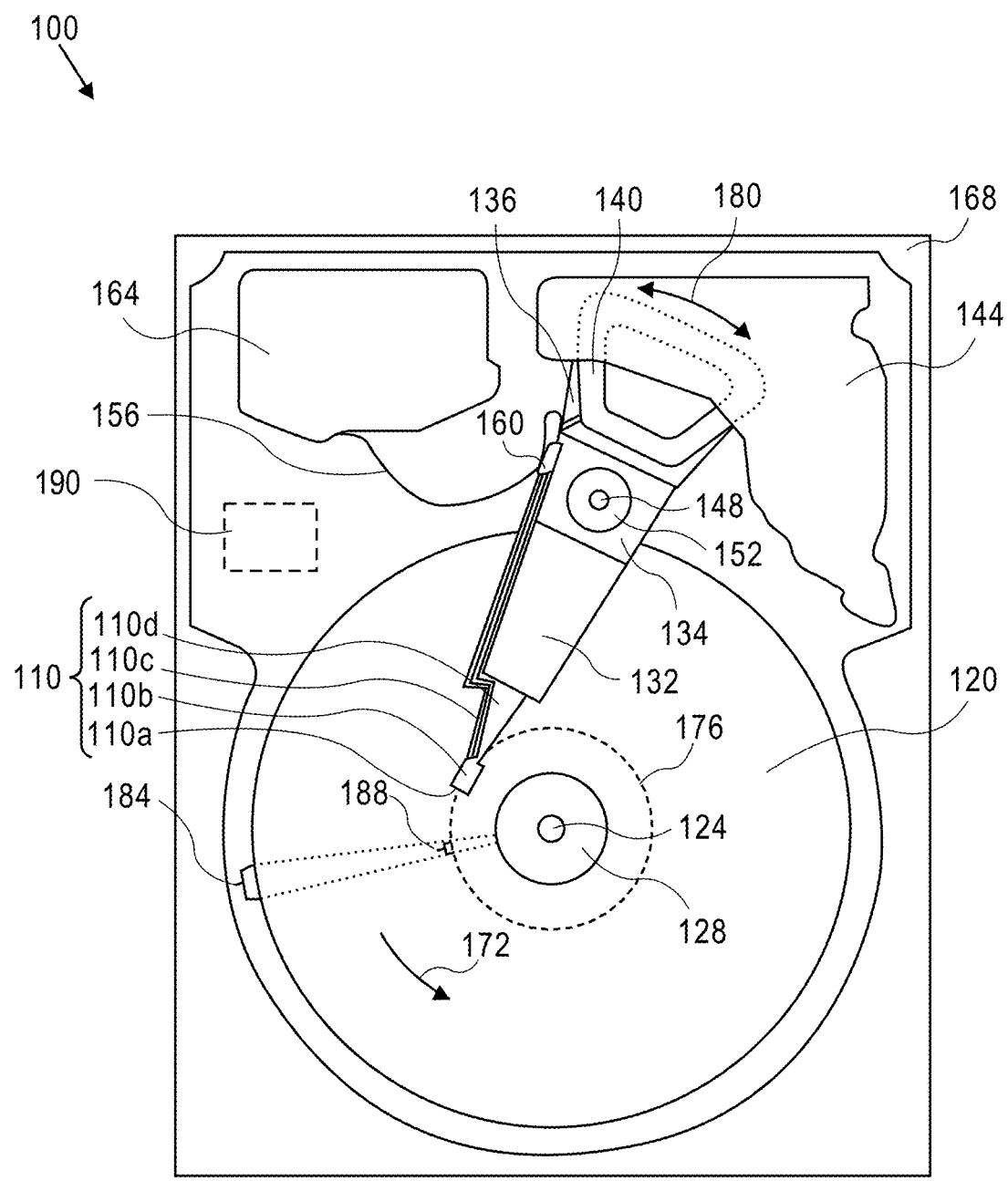
FIG. 1 is a plan view illustrating a hard disk drive, according to an embodiment.

Generally, approaches to adaptively sliding sectors in a shingled magnetic recording (SMR) hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that shingled magnetic recording (SMR) removes the gaps between tracks by sequentially writing tracks in an overlapping manner and that, therefore, once one track is written the write head is advanced by only part of its width so the next track will partially overwrite the previous one. Recall also that inevitable track misregistration (TMR) needs to be accounted for in the process of writing SMR tracks. However, TMR is highly variable between tracks, especially when operational vibration is taken into account.

A traditional track layout employs fixed track pitches (e.g., the distance between adjacent track centers) for data regions of the SMR hard disk drive (HDD). For both CMR and early SMR a fixed track pitch is typically defined statically and permanently (e.g., at manufacturing time) by a calculation involving, among other parameters, how narrow the write inhibit (WI) band can be while still meeting the required performance. Generally, write inhibit refers to the distance a write head can deviate from the intended track center without triggering an abort and retry of a given write, which is based at least in part on the magnetic capabilities of specific head-media combinations. This approach may be considered and referred to as performance-constrained track width.

Figure 2B:
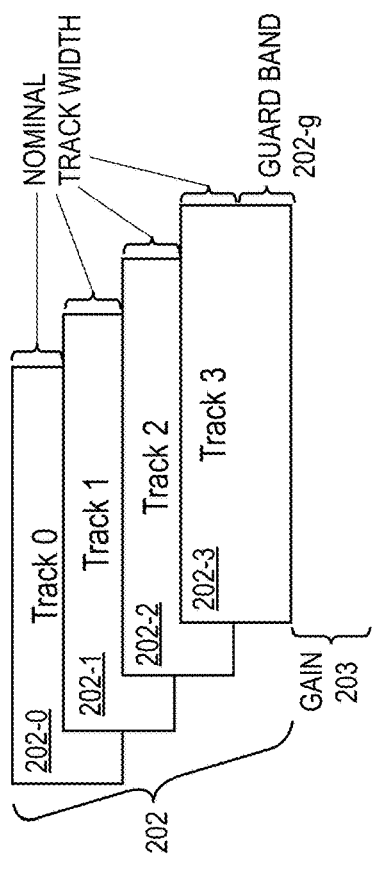
FIG. 2B is a diagram illustrating a shingled magnetic recording average-based data track layout, according to an embodiment.
Figure 2C:
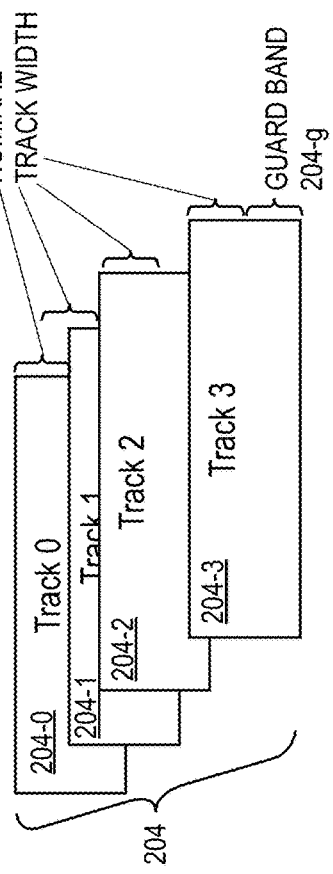
FIG. 2C is a diagram illustrating a dynamic shingled magnetic recording positional accuracy-based data track layout, according to an embodiment.
Figure 2A:
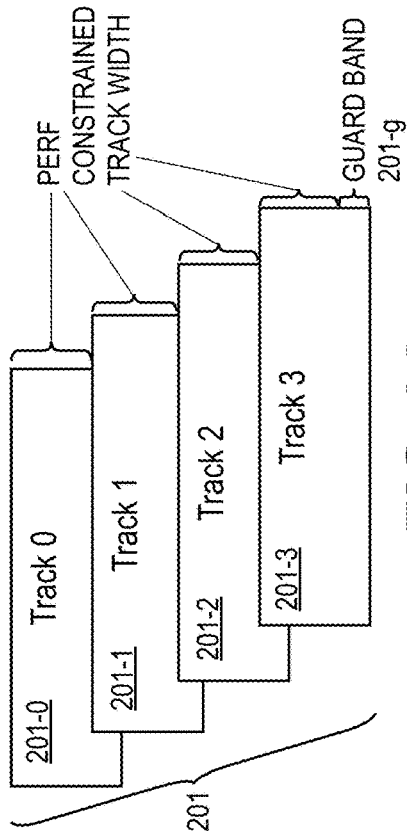
FIG. 2A is a diagram illustrating a traditional shingled magnetic recording data track layout, according to an embodiment.

FIG. 2A is a diagram illustrating a traditional shingled magnetic recording data track layout, according to an embodiment. FIG. 2A illustrates such a performance-constrained fixed track width and pitch for a plurality of sequentially-written SMR data tracks: track 201-0 ("Track 0"), track 201-1 ("Track 1"), track 201-2 ("Track 2"), track 201-3 ("Track 3"), simply representing a zone 201. Further, zone 201 includes a guard band 201-g at the end of the zone of tracks 201-0 through 201-3. Thus, every zone (of, e.g., 256 Megabytes) is typically allocated or budgeted (e.g., effectively formatted) with the number of shingled tracks needed to meet the predetermined fixed track width and corresponding shingled track pitch. Note that guard band 201-g is conceptually drawn as part of Track 3 because, even if it is part of what is written as Track 3, that portion of the track is not used for any further shingle writing of a next track. In other words, no additional track will be shingled written onto that portion of Track 3, and the disk memory space there can't be consumed. This also applies to other guard bands shown in FIGS. 2B-2C.

In the context of write operations, the performance loss due to write inhibits (or simply "inhibit") is a limiting factor. For example, for a 1% performance loss limit, no more than 1 in 100 tracks can get an inhibit, where the performance loss corresponds largely with the need to rewrite at least some portion of the track on the next disk revolution after encountering an inhibit. In the traditional model, the write inhibit and therefore the track pitch is tuned such that there is only a 1 in 100 chance of an inhibit for each and every track. In this case, the track width is set based conceptually on a worst-case scenario where each track width is wide enough such that only 1 of every 100 tracks will hit the inhibit boundary (e.g., some distance off from track center) on either side of the track. That is, in a region with 100 tracks, the traditional model defines all tracks equally at Xnm where X gives a 1% inhibit rate (therefore the region is 100*Xnm). Consequently, a significant amount of disk surface memory space is effectively wasted so that there is adequate track width margin so that only 1% of the tracks exceed the inhibit boundary.

Positional Accuracy-Based Track Layout

More complex approaches may be utilized to gain more useable data storage space of a given disk, such as by slightly modulating a subsequent track center (e.g., by modifying servo flight) based on the previous track write, to avoid track following too close to the previous write path and thereby risking overwriting any portion of the previous write. With such a paradigm, the operational track center modulations may be characterized in advance to define a nominal track width.

FIG. 2B is a diagram illustrating a shingled magnetic recording average-based data track layout, according to an embodiment. FIG. 2B illustrates such an average-based fixed track width and pitch for a plurality of sequentially-written SMR data tracks: track 202-0 ("Track 0"), track 202-1 ("Track 1"), track 202-2 ("Track 2"), track 202-3 ("Track 3"), simply representing a zone 202. Further, zone 202 also includes a guard band 202-g at the end of the zone of tracks 202-0 through 202-3. Thus, every zone is typically allocated, budgeted, formatted with the number of shingled tracks needed to meet the predetermined shingled track width ("nominal track width") and corresponding track pitch, resulting in an overall gain 203 of useable physical memory space across the disk. Here, the nominal track width and track pitch is effectively defined by the average positional error across a zone rather than by a worst-case scenario positional error across the zone. Accordingly, the inhibit is still set for a 1 in 100 chance of an inhibit but instead of that defining the track pitch, the real track pitch of the 99 successes is used to formulate (e.g., pre-estimate during manufacturing testing) the nominal track width and to allocate the disk memory space accordingly, thereby manifesting or recognizing the memory space (i.e., data capacity) gain 203 of FIG. 2B in comparison with FIG. 2A. Thus, enough radial disk space (nm) is needed to handle the real variation of writes among all 100 tracks. Since only the worst writes will be at Xnm, the sum of the region in this new model will be less than 100*Xnm, whereby the exact amount of space needed/consumed is dependent on the positional accuracy (e.g., TMR, PES) distribution, which is more likely to be closer to the center of track than the extreme of the write inhibit setting. As such, the gain 203 (e.g., tighter tracks per inch, or higher "TPI") is conceptually and statistically/practically realized based on the recognition that not every write will be positionally inaccurate, and enabling and allocating capacity and operating/writing accordingly, while maintaining relatively equivalent performance/reliability.

Note that zone 201 of FIG. 2A and zone 202 of FIG. 2B are illustrated in an aligned format with each other, to visually illustrate the gain 203 that may be realized by narrowing the track pitch (e.g., the distance between one or more adjacent track centers) by using the nominal track width (e.g., a pre-estimated average track width) of FIG. 2B relative to the pure performance-based track pitch (e.g., worst-case scenario) of FIG. 2A. In both cases, the respective write inhibit constraints, and corresponding track widths and pitches, are set to tolerate and are thus allocated for a certain frequency of actual write inhibit aborts per zone, such as for a non-limiting example the 1 in 100 chance of an inhibit for the tracks within a zone.

FIG. 2C is a diagram illustrating a dynamic shingled magnetic recording positional accuracy-based data track layout, according to an embodiment. FIG. 2C illustrates positional accuracy-based dynamic track width for a plurality of sequentially-written SMR data tracks: track 204-0 ("Track 0"), track 204-1 ("Track 1"), track 204-2 ("Track 2"), track 204-3 ("Track 3"), simply representing a zone 204. Further, zone 204 also includes a guard band 204-g at the end of the zone of tracks 204-0 through 204-3. The "positional accuracy" term used herein generally refers to the ability of the servo system to position the read-write head on, and to follow around for a disk revolution (e.g., "track following"), the target tracking position or the so-called "track center". This track following ability may be affected by many factors, including drive disturbances such as internal and external vibrations, including for example operational vibration ("opvibe") events or occurrences.

According to an embodiment, the determination and layout, positioning, placement of a given track is determined by the positional accuracy of a previously written track. With reference to the example scenario of FIG. 2C, a nominal track width (see, e.g., FIG. 2B) is used as the target track width for writing track 204-0. In this example scenario, track 204-0 is written with a little inaccuracy relative to the track center target. Hence, in response, track 204-1 is kept at the nominal, i.e., track 204-1 is written at the nominal track position by radially moving the write head the corresponding nominal distance from the written track 204-0. In this example scenario, track 204-1 is written very clean (i.e., accurately to the track center target). Hence, in response, track 204-2 is pulled in from the nominal, i.e., track 204-2 is positioned radially closer to track 204-1 than at a position corresponding to the nominal track width by radially moving the write head a shorter distance (in the shingling direction) from the written track 204-1 than would be the distance corresponding to the nominal track width. Next in this example scenario, track 204-2 is written with significant inaccuracy relative to the track center target. Hence, in response, track 204-3 is pushed out from the nominal, i.e., track 204-3 is positioned radially farther from track 204-2 than at a position corresponding to the nominal track width by radially moving the write head a longer distance from the written track 204-2 than would be the distance corresponding to the nominal track width, and creating the guard band 204-g thereafter.

According to an embodiment, the information readily available to identify and evaluate the ability of the head to accurately track-follow is the Position Error Signal (PES), which is related to (e.g., computationally corresponds to) and/or used to compensate for the track misregistration (TMR). PES is proportional to the radial distance between the position of the read/write head and the reference track center, and is determined via the servo sectors embedded on each recording disk medium. Thus, as the PES is commonly utilized by a controller to track follow while writing a track, PES is considered a fundamental on-the-fly track write information that is readily available (e.g., likely temporarily stored in drive SRAM (static random-access memory) or DRAM (dynamic random-access memory), for non-limiting examples) for dynamically determining a positional accuracy-based dynamic track pitch. Typically, the PES is analyzed and utilized in the down-track direction, e.g., to properly servo the head flight along a given track. Here, by contrast, the PES is effectively utilized in the cross-track direction, e.g., to determine a succeeding track (e.g., track 204-3) position based on the preceding track's (e.g., track 204-2) write positional accuracy and based on the nominal track width defined by the successful write scheme described above. Note that the positional accuracy of more than one preceding track, possibly even excluding the immediately prior track, may be used to determine a succeeding track position, and this may vary from implementation to implementation.

In some embodiments, the dynamic track positioning scheme exemplified in FIG. 2C enables use of the aforementioned nominal track width (see, e.g., FIG. 2B) determined based on expected or estimated average PES for tracks in a zone. This is because, inherent in the average PES underlying the nominal track width, some tracks will have a PES worse than the average, while others will have a PES better than the average. Since the nominal track width in FIG. 2B represents a more aggressive spacing than the prior fixed width spacing in FIG. 2A, the dynamic track positioning scheme in FIG. 2C allows accumulation of spacing margins from well-written tracks (with position errors below the average PES) that are written earlier in the zone. The accumulated spacing margins can then be "spent," if needed, on poorly written tracks with larger positioning errors above the average PES. This ability to accumulate spacing margins enables the more aggressive nominal track width to be realized in practice, especially in view of the larger collection of tracks typically in a zone that would likely have a sufficient distribution of PES values. In addition, other techniques such as sliding sectors (described in more detail hereafter) and writing data to an alternative media (e.g., NAND) can also serve as enablers, in cases where the accumulated margins are insufficient for writing tracks near the end of the zone.

Method of Controlling a Shingled Magnetic Recording (SMR) Hard Disk Drive

Processing, functions, procedures, actions, method steps, and the like that are described herein may include enactment by execution of one or more sequences of one or more instructions stored in one or more memory units and which, when executed by one or more processors, cause such performance. Accordingly, the techniques described herein may be performed by a computing system in response to a processor(s) executing one or more sequences of one or more instructions contained in one or more main memory. Such instructions may be read into the main memory from another computer-readable medium. Execution of the sequences of instructions contained in the main memory causes the processor(s) to perform the process steps described herein. For example, these techniques may be performed within a hard disk drive such as HDD 100 (FIG. 1), such as by an electronic controller embodied in any form of and/or combination of software, hardware, and firmware, such as an application-specific integrated circuit (ASIC) comprising at least one memory unit for storing such instructions and at least one processor for executing such instructions. However, embodiments are not limited to any specific combination of hardware circuitry and software.

Figure 3:
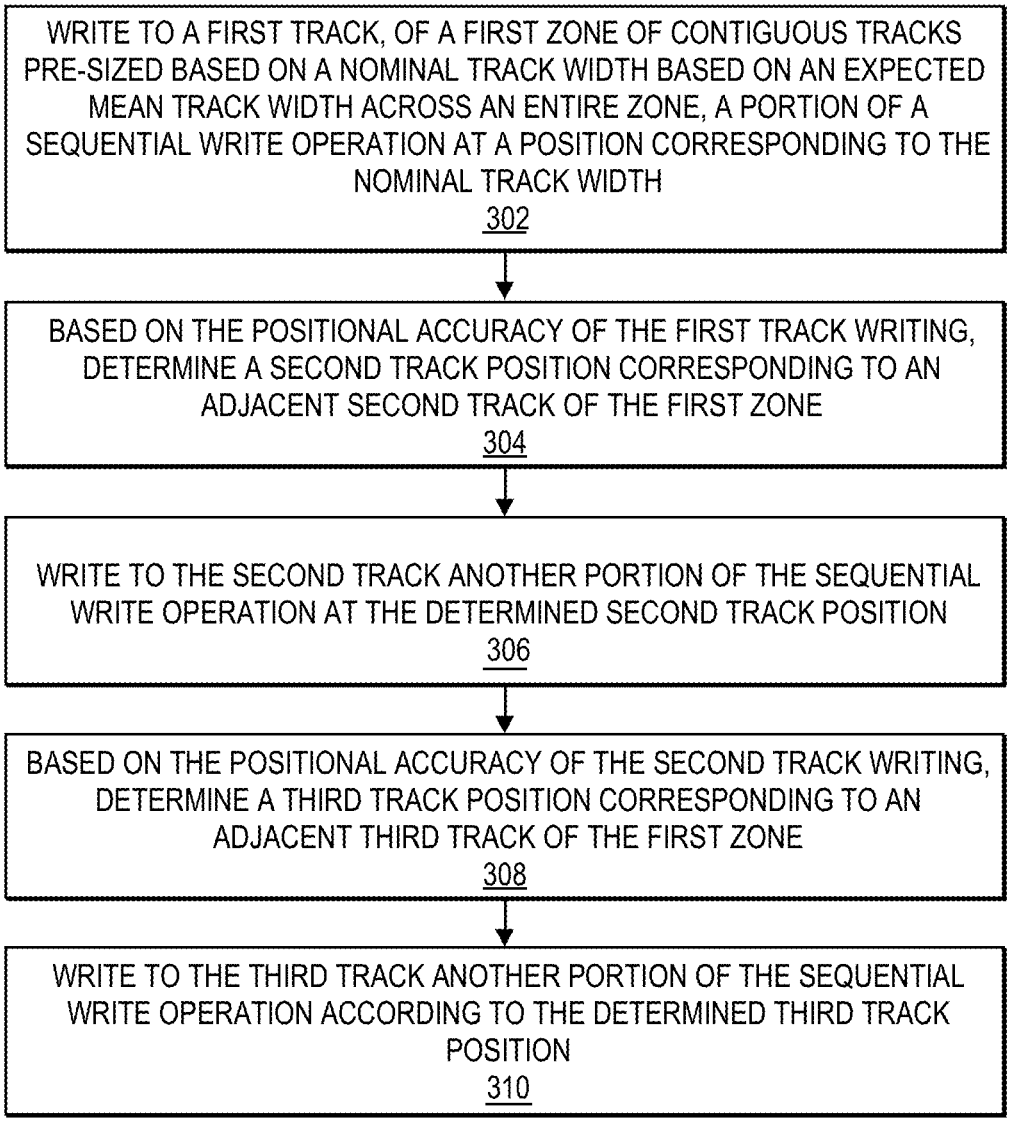
FIG. 3 is a flow diagram illustrating a method of controlling a shingled magnetic recording hard disk drive, according to an embodiment.

FIG. 3 is a flow diagram illustrating a method of controlling a shingled magnetic recording hard disk drive, according to an embodiment. For example, the method of FIG. 3 may be implemented to generate a track layout as exemplified in the description corresponding to FIG. 2C.

At block 302, write to a first track of a recording disk of a shingled magnetic recording (SMR) hard disk drive (HDD), of a first zone (for a non-limiting example, 256 MB) of contiguous tracks pre-sized based on a nominal track width based on an expected mean track width across an entire zone, a portion of a sequential write operation at a position corresponding to the nominal track width. For example, a track such as track 204-0 (Track 0) is written to a magnetic-recording disk of a shingled magnetic recording (SMR) hard disk drive, based on a position corresponding to a predetermined nominal track width computed or otherwise determined based conceptually on the expected average track width of successful writes (e.g., 99/100 writes for which the track following is accurate enough to avoid a write inhibit boundary) across an entire zone 204. For example, rather than using the fixed nominal track width of tracks 201-0 through 201-3 of zone 201 of FIG. 2A (e.g., a worst-case scenario), a nominal track width such as the nominal track width of tracks 202-0 through 202-3 of zone 202 of FIG. 2B may be computed or otherwise determined based on a less conservative per-track margin for what minimal number of tracks is needed to write an entire zone of tracks such that the probability of the average track width after a write exceeding the initially-allocated nominal track width lies within some system design constraints, such as the availability of memory for mitigating overflow (e.g., scratch space, NAND (NOT AND) flash, etc., as described in more detail elsewhere herein). The consideration is that the number of tracks contained within the zone provides enough samples (e.g., approximately 100 outer diameter tracks or 200 inner diameter tracks, for a non-limiting example) such that the zone average track width equals the overall average track width, such that the probability theory of the law of large numbers results, so track pitch (e.g., the distance between adjacent or a series of adjacent track centers) can be defined by mean track pitch rather than a worst-case track pitch.

At block 304, based on the positional accuracy of the first track writing, determine a second track position corresponding to an adjacent second track of the first zone of the recording disk. For example, based on the positional accuracy (e.g., the deviation from track center) of the head flight while writing track 204-0, such as based on the position error signal (PES) corresponding to the write operation of track 204-0, it may be determined (i) to write the next track at a closer position than the position corresponding to a nominal track width, (ii) to write the next track at a position corresponding to the nominal track width, or (iii) to write the next track at a position farther away than the position corresponding to a nominal track width. For example, if track 204-0 is written about as expected relative to nominal then the next track may be written at a position corresponding to the nominal track width, if track 204-0 is written significantly positionally accurately then the next track may be written at a closer position thus generating a narrowed track 204-0 relative to nominal, or if track 204-0 is written significantly positionally inaccurately then the next track may be written at a farther position thus generating a widened track 204-0 relative to nominal.

At block 306, write to the second track another portion of the sequential write operation at the determined second track position. For example, in response to track 204-0 being written significantly positionally accurately, track 204-1 is "pulled in" from the nominal track position, by moving the write head a shorter radial distance after writing track 204-0 than the distance corresponding to the nominal track width, to begin writing the next track 204-1.

At block 308, based on the positional accuracy of the second track writing, determine a third track position corresponding to an adjacent third track of the first zone of the recording disk. For example, based on the positional accuracy (e.g., the deviation from track center) of the head flight while writing track 204-1, such as based on the position error signal (PES) corresponding to the write operation of track 204-1, it may be determined (i) to write the next track at a closer position than the position corresponding to a nominal track width, (ii) to write the next track at a position corresponding to the nominal track width, or (iii) to write the next track at a position farther away than the position corresponding to a nominal track width. For example, if track 204-1 is written about as expected relative to nominal then the next track may be written at a position corresponding to the nominal track width, if track 204-1 is written significantly positionally accurately then the next track may be written at a closer position thus generating a narrowed track 204-1 relative to nominal, or if track 204-1 is written significantly positionally inaccurately then the next track may be written at a farther position thus generating a widened track 204-1 relative to nominal.

At block 310, write to the third track another portion of the sequential write operation according to the determined third track position. For example, in response to track 204-1 being written about as expected relative to nominal, track 204-2 is written at a position corresponding to the nominal track width, by moving the write head the radial distance corresponding to the nominal track width after writing track 204-1, to begin writing the next track 204-2.

This process of determining the track position for the next track based on the positional accuracy of the writing of the previous track, and writing the next track according to that determined track position, is repeated for each subsequent track in the zone of which the first, second, and third tracks are constituent. Furthermore and according to an embodiment, the on-the-fly procedure of FIG. 3 is repeated for each subsequent zone of the recording disk, where each zone is pre-sized to the same zone memory size (for a non-limiting example, 256 MB) based on the same nominal track width for the head-disk system, based on an expected mean track width across each entire zone of the recording disk. With respect to the foregoing blocks 302-310, references to a "track" includes references to a "sector" of a track. Stated otherwise, each of the writing and determining steps may be implemented in the context of a disk sector (e.g., a portion of a track) rather than an entire track.

As described throughout herein, the determination and layout, positioning, placement of a given shingled track, which establishes the track width of a previously written shingled track, is determined on-the-fly by the positional accuracy of the previously written track, considering for example the PES corresponding to the writing of the previously written track. Thus, track pitch is effectively defined by the average positional error across a zone rather than by a worst-case scenario positional error across the zone. Every zone is pre-allocated with the number of tracks needed to meet the predetermined nominal track width and corresponding track pitch, resulting in an overall gain of useable physical memory space across the disk. As such, higher tracks per inch (TPI) can be realized based on the recognition that not every write will be positionally inaccurate (e.g., bad PES), and allocating the capacity and operating accordingly.

Handling Repeated Positional Inaccuracy

If enough positional inaccuracy (e.g., PES) continues for the entirety of a sequential write operation, initial assumptions may not be met (e.g., in computing the nominal track width) and it may be that there is insufficient space to handle the remaining track writes, i.e., the allocated zone space is exceeded. In that the case there are approaches to handling such a "zone exceeded" condition. One approach may involve continuing to allow tracks to write "wide" with positional inaccuracy, which may result in the loss of one or more tracks in the zone, which leads to capacity that cannot fit in the zone and needs to overflow. Here, the overflow can be written to a limited size scratch space on the disk (e.g., memory space on the disk that is typically used for storage of temporary user data) or a nonvolatile storage such as NAND. For example, certain HDD architectures may utilize dedicated NAND memory, not necessarily for the traditional uses of DRAM semiconductor memory, such as for booting and/or user data caching, but for improving HDD management functions to gain areal density or for other functional benefits. Another approach may involve tightening the write inhibit boundary to ensure the follow-on writes fit a "narrow" track, to attempt to avoid the zone exceeded condition altogether. However, that approach can incur a performance loss, which may be considered acceptable. Alternatively, detrimental effects of this approach may be mitigated with "sliding" sectors, described in more detail elsewhere herein.

"Sliding" Sectors

Figure 5A:
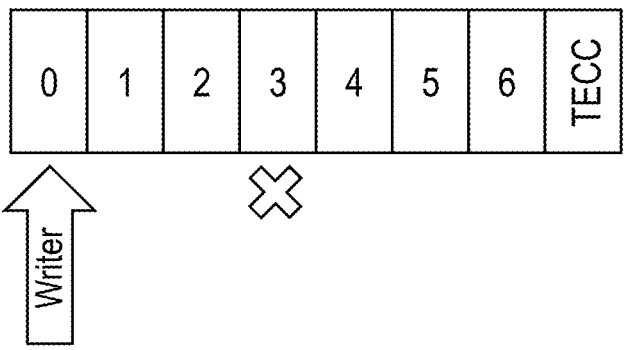
FIG. 5A is a diagram illustrating a first approach to triggering a write inhibit while attempting to write a sector.

FIG. 5A is a diagram illustrating a first approach to triggering a write inhibit while attempting to write a sector. Typically, when writing to sectors on a recording disk, if a write attempt encounters a write inhibit boundary then that disk revolution is foregone and effectively "wasted" as a second attempt to write to that sector typically follows on a subsequent revolution. This is exemplified in FIG. 5A, which shows a write inhibit is triggered while attempting to write sector 3 (marked by the "X"), and then the writer's position is reset in a subsequent revolution which will rewrite sector 3. The track ECC (track error-correcting code, or "TECC") sector stores parity information or otherwise necessary error correction information of the preceding sectors on the track (in this example, a track of written sectors). Though a few sectors are shown in this example, there may be many more sectors in a track with a TECC sector, and there may be more than one TECC sector per track (TECC sector associated with sectors within a portion of a track).

Figure 5B:
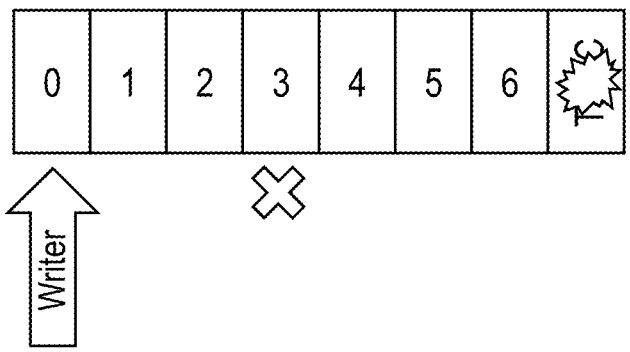
FIG. 5B is a diagram illustrating a second approach to triggering a write inhibit while attempting to write a sector.

FIG. 5B is a diagram illustrating a second approach to triggering a write inhibit while attempting to write a sector. Another approach to consider when a write inhibit occurs may be to continue the write attempt after encountering the write inhibit boundary (e.g., write what can be written once the inhibit clears), and writing the inhibited sector(s) to other out-of-line memory (e.g., DRAM) and then ultimately de-staging to non-volatile NAND. FIG. 5B shows this approach, in which sector 3 is not written to the track due to write inhibit. However, this results in the sequential data being recorded out of order, and the corresponding TECC being weaker or invalid because the TECC was written assuming the write to the inhibited sector was there, which it is actually not there (e.g., the attempted, now inhibited, write triggered a hard error).

Figure 5C:
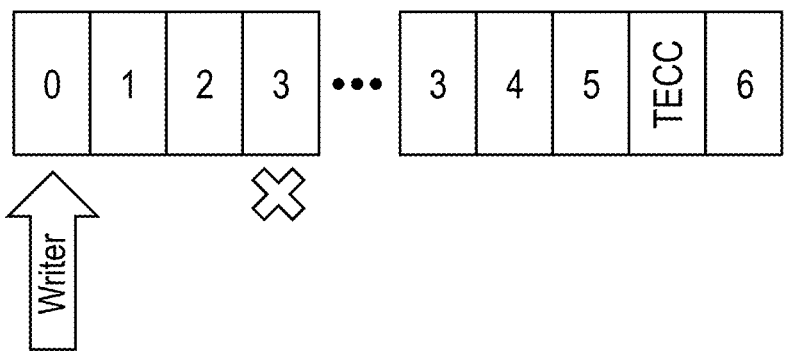
FIG. 5C is a diagram illustrating a sliding sectors approach to triggering a write inhibit while attempting to write a sector, according to an embodiment.

FIG. 5C is a diagram illustrating a sliding sectors approach to triggering a write inhibit while attempting to write a sector, according to an embodiment. As alluded to, in the context of the foregoing dynamic track pitch approach, if many positionally inaccurate (e.g., bad PES, bad TMR) tracks have been written in a zone, there is thus less margin for positionally inaccurate writes at the end of the zone. As a result, writes need to meet a higher accuracy standard for completion, such as by way of a reduced write inhibit. To mitigate the consequent performance penalty, in some embodiments, in response to a logical sector failing to write to a physical sector, instead of that failure being a hard error, according to an embodiment the HDC (hard disk controller) read-write channel electronics instead adaptively writes the data to the next down-track physical sector possible, i.e., "sliding" to the next sector. This is shown in FIG. 5C, where sector 3 is initially attempted to be written, but the write inhibit causes the write to be aborted (denoted by the X). The following blank space (represented by an ellipsis) represents some amount of interruption as the head continues down-track without being able to write. At some point, writing is no longer inhibited, and then sector 3 is written at the next available sector down-track, shifting the rest of the sectors down-track. This does not require an additional disk revolution thus there is little to no performance penalty. The data is maintained in sequential order, and because the sliding happens before TECC parity or protection information is finalized and written, the TECC can account for the sector shift due to sliding. Thus, the large block protection (e.g., track ECC) is intact to maintain data integrity. By skipping the failing physical sectors, there may be sectors that overflow the track. According to an embodiment, such sliding may continue as necessary in write inhibit scenarios throughout the entire zone to maintain all the data in sequential form for performance. When the zone end is reached the overflow sectors are either written at spare capacity at the end of the zone or in spare regions elsewhere (e.g., at scratch space), according to an embodiment.

Because the sliding scenario is triggered by an attempted write positioning beyond the write inhibit boundary, when starting a track, it is important to know what write inhibit target is being used for that track. For the sake of simplicity and an example, relative "narrow" and "wide" are referenced, but write inhibit target can be variable anywhere in between these general constructs. Assuming a wide inhibit criteria is the default, then a narrow inhibit criteria may be used based on one or more of the following criteria: (i) the capacity (e.g. nm) remaining in the zone is insufficient for writing at the wider track pitch, (ii) the capacity (scratch space, NAND, etc.) is insufficient for meeting capacity target while writing the zone, (iii) recent opvibe trends, where good recent opvibe would likely prefer narrow inhibit criteria while bad trends would likely prefer leveraging available scratch space. Furthermore, even if wide inhibit criteria is used, there is an option to narrow that write inhibit as the write makes progress if the write has good positional accuracy during the write, i.e., adaptive write inhibit. For example, if a track has written within the narrow inhibit criteria for all but one sector of the track, it would likely be better to narrow the inhibit on-the-fly to the narrow criteria to trigger such sliding rather than allowing a really inaccurately written sector redefine the entire written track pitch or position right at the end. Thus, one possible approach for this would be to take the input write inhibit and the worst written PES on the track and set the inhibit to (% not written)×(input inhibit)+ (% written)×(worst inhibit), which enables the real PES to slowly define the inhibit as the write progresses.

The foregoing sector sliding technique offers a performance advantage over other approaches, but can come with a penalty to scratch space or other memory. Therefore, it is advantageous to decide whether sliding will be used before commencing a write, which may be based on the amount of scratch space available, recent opvibe trends, and the like. However, the availability of both the "track slipping" technique and the "sector sliding" technique can provide an opportunity for on-the-fly optimization among the two techniques. Generally, for example, there may be scenarios in which it is better to slide a sector rather than to adapt (e.g., widen) a track according to the slipping technique, e.g., and risk running out of memory space in the zone. Further, for example, there may be scenarios in which it is considered better to slide a sector to allow or enable a better (e.g., narrower) track width according to the slipping technique, e.g., and risk running in to more write inhibit boundaries.

While sector sliding may be implemented as an on-the-fly option, there is also the option of looking at how a track was written after the fact, where the analysis may look for outlier PES that is changing the possible track pitch in a noticeable way. If an outlier sector(s) is identified, one option is to simply move that sector(s) to a scratch space. For example and according to an embodiment, to determine whether to move sectors, the following computational logic may be considered: if (# of sectors to slide)/(# of sectors on track)< (nm pull in by narrowing track)/(nm for a nominal track), then the capacity lost by sliding/moving sectors is outweighed by the capacity gained with the TPI push. Another option involves simply rewriting the bad sectors, which would cost a revolution of performance but because no shingling has yet occurred rewriting is functionally feasible. Yet another option involves adding extra redundancy (e.g., TECC) to some non-volatile storage (see, e.g., NAND flash memory 190 of FIG. 1).

Figure 4:
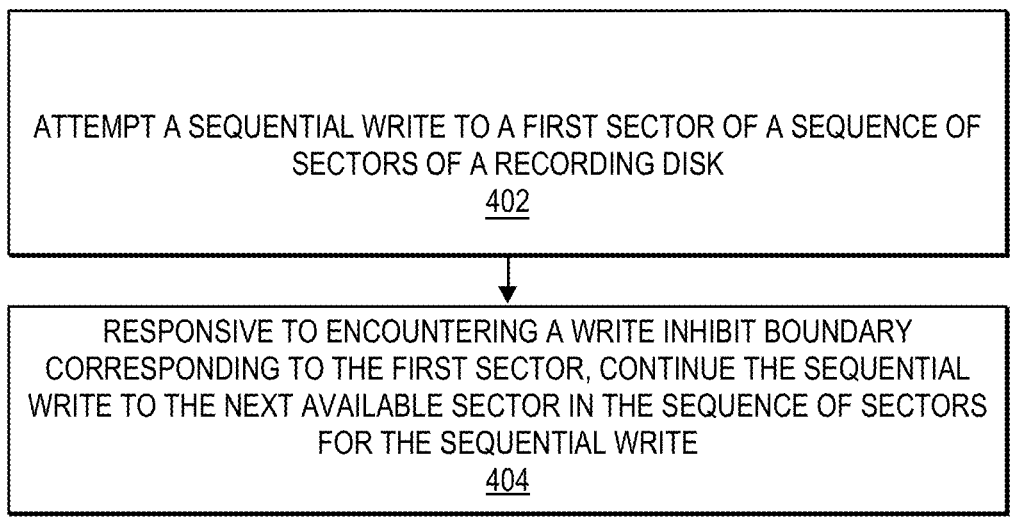
FIG. 4 is a flow diagram illustrating a method of controlling a shingled magnetic recording hard disk drive, according to an embodiment.

Method of Controlling a Shingled Magnetic Recording (SMR) Hard Disk Drive-Sliding Sectors FIG. 4 is a flow diagram illustrating a method of controlling a shingled magnetic recording hard disk drive, according to an embodiment. Here also, the techniques described herein may be performed by a computing system in response to a processor(s) executing one or more sequences of one or more instructions contained in one or more main memory. Such instructions may be read into the main memory from another computer-readable medium. Execution of the sequences of instructions contained in the main memory causes the processor(s) to perform the process steps described herein. For example, these techniques may be performed within a hard disk drive such as HDD 100 (FIG. 1), such as by an electronic controller embodied in any form of and/or combination of software, hardware, and firmware, such as an application-specific integrated circuit (ASIC) comprising at least one memory unit for storing such instructions and at least one processor for executing such instructions. However, embodiments are not limited to any specific combination of hardware circuitry and software.

At block 402, attempt a sequential write to a first sector of a sequence of sectors of a recording disk. For example, a sequential write operation is commenced or continued at a particular sectored track portion 188 (FIG. 1), or simply "sector".

At block 404, responsive to encountering a write inhibit boundary corresponding to the first sector, continue the sequential write to the next available sector in the sequence of sectors for the sequential write. For example, upon encountering a write inhibit boundary while writing to the first sector, continue the write operation of block 402 to the next available sectored track portion 188. As discussed and according to an embodiment, in response to encountering the end of a sector at the end of a first track, the sequential write may be continued at the next sector in the sequence of sectors at an adjacent second track. Stated otherwise, sectors may be slid from one track to the next within a zone. Furthermore, and according to an embodiment, in response to encountering the end of a zone of tracks for the sequential write, the overflow sector(s) may be written to spare memory capacity associated with the zone. If there is no spare zone-associated memory available, then the sequential write may be continued to spare memory elsewhere on the recording disk, e.g., scratch space, NAND flash, and the like.

As discussed elsewhere herein, the availability of both the "track slipping" technique and the "sector sliding" technique can provide an opportunity for on-the-fly optimization among the two techniques. Hence, in response to encountering a write inhibit boundary, a determination may be made based on the positional accuracy of the current (or previous) track writing, of a different track width corresponding to the next track of the recording disk. Then, a determination may be made whether to continue the sequential write to the next available sector in the sequence of sectors for the sequential write (e.g., sector sliding) or to write to the next track according to the determined different track width (e.g., track slipping). Stated otherwise, the benefits and risks associated with each of the track slipping technique and the sector sliding technique may be logically considered to enable an optimized on-the-fly solution to mitigating the effect of the write inhibit.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller (or "controller circuitry") and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In the case of shingled magnetic recording (SMR), the data tracks are written to the medium 120 sequentially in a partially overlapping manner. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168. According to an embodiment, the electronic components include a NAND flash memory 190 component or circuitry. NAND flash memory 190 may be configured to store multiple bits within a single NAND cell. Single-level Cell (SLC) stores one bit/cell, while Triple-level Cell (TLC) can store 3 bits/cell. SLC offers higher performance, higher program-erase (P/E) cycles and higher data retention margins compared to TLC, which enables 3× storage in the same footprint as SLC. Application of this NAND technology can enable both SLC for write-heavy operations and TLC and above for read-heavy operations in the same device.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A shingled magnetic recording (SMR) data storage device comprising an electronic controller comprising one or more sequences of instructions which, when executed by one or more processors, individually or in combination, cause performance of:
    attempting a sequential write to a first sector of a sequence of sectors of a recording disk;
    responsive to encountering a write inhibit boundary corresponding to the first sector, continuing the sequential write in a same disk revolution to the next available sector in the sequence of sectors for the sequential write; and
    dynamically adjusting the write inhibit boundary to inhibit writing of a sector within the sequence of sectors at a track misregistration that will increase a resultant track pitch of a track corresponding to the written sequence of sectors.

2. The SMR data storage device of claim 1, wherein the one or more sequences of instructions, when executed by the one or more processors, individually or in combination, cause further performance of:
    responsive to encountering the end of a first track, writing a track error correction parity sector at the end of the first track and continuing the sequential write to the next sector in the sequence of sectors at an adjacent second track.

3. The SMR data storage device of claim 1, wherein the sequence of sectors is being written to in an SMR zone of the recording disk, and wherein the one or more sequences of instructions, when executed by the one or more processors, individually or in combination, cause further performance of:
    adjusting the write inhibit boundary based on one or more of:
        remaining capacity in the SMR zone;
        storage capacity outside of the SMR zone for writing sectors that cannot be written in the SMR zone due to the write inhibit boundary; and
        operational vibration trends observed when writing in the SMR zone.

4. The SMR data storage device of claim 1, wherein the one or more sequences of instructions, when executed by the one or more processors, individually or in combination, cause further performance of:
    responsive to encountering the end of a zone of tracks for the sequential write, continuing the sequential write to spare memory capacity associated with the zone.

5. The SMR data storage device of claim 4, wherein the one or more sequences of instructions, when executed by the one or more processors, individually or in combination, cause further performance of:
    responsive to encountering no spare memory capacity associated with the zone, continuing the sequential write to spare memory elsewhere on the recording disk or to non-volatile memory elsewhere in the data storage device.

6. A method of controlling a shingled magnetic recording (SMR) hard disk drive, the method comprising:
    attempting a sequential write to a first sector of a sequence of sectors of a recording disk;
    responsive to encountering a write inhibit boundary corresponding to the first sector, continuing the sequential write in a same disk revolution to the next available sector in the sequence of sectors for the sequential write; and
    responsive to encountering the end of a sector at the end of a first track, writing a track error correction parity sector at the end of the first track and continuing the sequential write to the next sector in the sequence of sectors at an adjacent second track.

7. The method of claim 6, further comprising:
    dynamically adjusting the write inhibit boundary to inhibit writing of a sector within the sequence of sectors at a track misregistration that will increase a resultant track pitch of a track corresponding to the written sequence of sectors.

8. The method of claim 6, wherein the sequence of sectors is being written to in an SMR zone of the recording disk, the method further comprising:
    adjusting the write inhibit boundary based on one or more of:
        remaining capacity in the SMR zone;
        storage capacity outside of the SMR zone for writing sectors that cannot be written in the SMR zone due to the write inhibit boundary; and
        operational vibration trends observed when writing in the SMR zone.

9. The method of claim 6, further comprising:
    responsive to encountering the end of a zone of tracks for the sequential write, continuing the sequential write to spare memory capacity associated with the zone.

10. The method of claim 9, further comprising:
    responsive to encountering no spare memory capacity associated with the zone, continuing the sequential write to spare memory elsewhere on the recording disk or to non-volatile memory elsewhere in the SMR hard disk drive.

11. A controller circuitry storing or accessing one or more sequences of instructions which, when executed by one or more processors, individually or in combination, cause performance of:
    attempting a sequential write to a first sector of a sequence of sectors of a recording disk, wherein the sequence of sectors is being written to in an SMR zone of the recording disk;
    responsive to encountering a write inhibit boundary corresponding to the first sector, continuing the sequential write in a same disk revolution to the next available sector in the sequence of sectors for the sequential write; and adjusting the write inhibit boundary based on one or more of:
  remaining capacity in the SMR zone;
  storage capacity outside of the SMR zone for writing sectors that cannot be written in the SMR zone due to the write inhibit boundary; and
  operational vibration trends observed when writing in the SMR zone.

12. The controller circuitry of claim 11, wherein the one or more sequences of instructions, when executed by the one or more processors, individually or in combination, cause further performance of:
  dynamically adjusting the write inhibit boundary to inhibit writing of a sector within the sequence of sectors at a track misregistration that will increase a resultant track pitch of a track corresponding to the written sequence of sectors.

13. The controller circuitry of claim 11, wherein the one or more sequences of instructions, when executed by the one or more processors, individually or in combination, cause further performance of:
  responsive to encountering the end of a sector at the end of a first track, writing a track error correction parity sector at the end of the first track and continuing the sequential write to the next sector in the sequence of sectors at an adjacent second track.

14. The controller circuitry of claim 11, wherein the one or more sequences of instructions, when executed by the one or more processors, individually or in combination, cause further performance of:
  responsive to encountering the end of the SRM zone for the sequential write, continuing the sequential write to spare memory capacity associated with the zone.

15. The controller circuitry of claim 14, wherein the one or more sequences of instructions, when executed by the one or more processors, individually or in combination, cause further performance of:
  responsive to encountering no spare memory capacity associated with the zone, continuing the sequential write to spare memory elsewhere on the recording disk or to non-volatile memory elsewhere in a data storage device of which the controller circuitry is part.

16. A data storage device comprising the controller circuitry of claim 11, further comprising:
  a plurality of recording disk media rotatably mounted on a spindle;
  means for, under the control of the controller circuitry, writing to and reading from a first recording disk medium of the plurality of recording disk media; and
  means for moving the means for writing and reading to access portions of the first recording disk medium.

17. A controller circuitry storing or accessing one or more sequences of instructions which, when executed by one or more processors, individually or in combination, cause performance of:
  attempting a sequential write to a sector, of a first track at a first position corresponding to a nominal track width, of a sequence of sectors of a shingled magnetic recording disk;
  determining, based on the positional accuracy of at least a portion of the first track writing, a second track position corresponding to an adjacent second track of the recording disk and not corresponding to the nominal track width, wherein the recording disk comprises a plurality of zones with each zone pre-sized to a same zone memory size based on the nominal track width based on an expected mean track width across an entire zone of the recording disk; and
  responsive to encountering a write inhibit boundary corresponding to the sector,
    determining whether to continue the sequential write to the next available sector in the sequence of sectors for the sequential write or to write to the second track according to the determined second track position, and
    based on the determining, (i) continuing the sequential write in a same disk revolution to the next available sector in the sequence of sectors for the sequential write, wherein responsive to encountering the end of a sector at the end of the first track, writing a track error correction parity sector at the end of the first track and continuing the sequential write to the next sector in the sequence of sectors at an adjacent second track, or (ii) writing to the second track according to the determined second track position.

18. A shingled magnetic recording (SMR) data storage device comprising an electronic controller comprising one or more sequences of instructions which, when executed by one or more processors, individually or in combination, cause performance of:
  attempting a sequential write to a first sector of a sequence of sectors of a recording disk;
  responsive to encountering a write inhibit boundary corresponding to the first sector, continuing the sequential write in a same disk revolution to the next available sector in the sequence of sectors for the sequential write; and
  responsive to encountering the end of a first track, writing a track error correction parity sector at the end of the first track and continuing the sequential write to the next sector in the sequence of sectors at an adjacent second track.

19. A shingled magnetic recording (SMR) data storage device comprising an electronic controller comprising one or more sequences of instructions which, when executed by one or more processors, individually or in combination, cause performance of:
  attempting a sequential write to a first sector of a sequence of sectors of a recording disk, wherein the sequence of sectors is being written to in an SMR zone of the recording disk;
  responsive to encountering a write inhibit boundary corresponding to the first sector, continuing the sequential write in a same disk revolution to the next available sector in the sequence of sectors for the sequential write; and
  adjusting the write inhibit boundary based on one or more of:
    remaining capacity in the SMR zone;
    storage capacity outside of the SMR zone for writing sectors that cannot be written in the SMR zone due to the write inhibit boundary; and
    operational vibration trends observed when writing in the SMR zone.

* * * * *